United States Patent

Carter et al.

Patent Number: 5,964,514
Date of Patent: Oct. 12, 1999

[54] ILLUMINATING INSTRUMENT PANEL GAUGE WITH INDICATOR AND GRAPHICS

[75] Inventors: James C. Carter, Clarkston; Richard Megregian, Farmington Hills; Eli Nichols, Plymouth, all of Mich.

[73] Assignee: Chrysler Corporation, Auburn Hills, Mich.

[21] Appl. No.: 08/936,573

[22] Filed: Sep. 24, 1997

[51] Int. Cl.⁶ .................................................. G01D 11/28
[52] U.S. Cl. .............................. 362/23; 362/28; 362/29; 116/256
[58] Field of Search ...................... 362/23, 28, 29; 116/256, 257, 263, 286, 287, 288, DIG. 36, DIG. 39, 62.1, 304

[56] References Cited

U.S. PATENT DOCUMENTS

| | | | |
|---|---|---|---|
| 2,094,075 | 9/1937 | Madan | 116/256 |
| 2,275,621 | 3/1942 | Gardinor | 362/29 |
| 4,011,085 | 3/1977 | Rapoport et al. | 359/893 |
| 4,013,465 | 3/1977 | Clapham et al. | 430/11 |
| 4,023,029 | 5/1977 | Fischer | 362/135 |
| 4,114,983 | 9/1978 | Maffitt et al. | 359/580 |
| 4,240,220 | 12/1980 | Smith | 40/564 |
| 4,246,713 | 1/1981 | Eckert | 40/437 |
| 4,772,096 | 9/1988 | Kai et al. | 359/601 |
| 5,243,463 | 9/1993 | Waintroob | 359/601 |
| 5,434,407 | 7/1995 | Bauer et al. | 250/227.24 |
| 5,493,445 | 2/1996 | Sexton et al. | 359/614 |
| 5,596,143 | 1/1997 | Hashimoto | 359/613 |

*Primary Examiner*—Cassandra Spyrou
*Assistant Examiner*—E. Cherry
*Attorney, Agent, or Firm*—Jennifer M. Stec

[57] ABSTRACT

An illuminating instrument panel gauge has a movable indicator, a front side for positioning toward a viewer and a back side for positioning away from the viewer. The gauge includes a light source, a subdial surface in front of the light source, a transparent gauge cover in front of and spaced apart from the subdial surface, and graphics corresponding to the movable indicator. The gauge cover has a first surface at the front side of the gauge cover and a second surface at the back side of the gauge cover. Either or both of the first and second surfaces of the gauge cover may be randomly textured. The movable indicator is positioned between the subdial surface and the gauge cover and is preferably closer to the gauge cover than it is to the subdial surface. The graphics are on either the first or second surface of the gauge cover. There may be an overlay between the light source and the indicator which allows light from the light source to illuminate the gauge cover yet hides the light source so that the light source is not visible to the viewer facing the instrument panel gauge. The gauge cover may be curved and, correspondingly, the movable indicator may be shaped to follow the curvature of the gauge cover.

9 Claims, 3 Drawing Sheets

ILLUMINATING INSTRUMENT PANEL GAUGE WITH INDICATOR AND GRAPHICS

BACKGROUND OF THE INVENTION

1. Field of the Invention

The present invention relates generally to illuminating instrument panel gauges and, more particularly, to illuminating instrument panel gauges having movable indicators.

2. Description of the Related Art

Illuminating instrument panel gauges for automobiles, usually placed in the dash, most often include those with movable indicators or pointers to show the status of various operations of the automobile. Such instrument panel gauges include speedometers, gas gauges, engine temperature gauges, and tachometers. FIG. 1 shows a cross sectional side view of typical current illuminating instrument panel gauge 10. Illuminating instrument panel gauge 10 has front side 12 facing the viewer (represented by eye 13) and back side 14 positioned away from the viewer and includes light source 16 at back side 14 of the gauge, overlay 18 covering light source 16, yet allowing some light to illuminate the gauge, transparent gauge cover 20 in front of and spaced apart from overlay 18, and at least one movable indicator 23 between overlay 18 and gauge cover 20. Gauge cover 20 has first surface 21 facing the viewer and second surface 22 opposite first surface 21. Overlay 18 has front surface 24 which is sometimes referred to as the "subdial surface" upon which graphics 26 are placed which correspond to movable indicator 23. For example, for a speedometer, the graphics would include 10, 20, 30, 40 (mph) and so on, and the movable indicator would point to the number representing the current speed.

Typical instrument panel gauge 10 also includes light-impervious brow 28 which reduces the amount of reflection from the instrument panel gauge to the viewer's eyes. For example, ambient light (e.g., from the sun), shown as arrow 30, passes through windshield 32 and hits brow 28. Without brow 28, the light would hit gauge cover 20 and some of the light would reflect back into the viewer's eyes, impairing the viewer's vision.

Brow 28 is also present to reduce the amount of reflectance caused by light-colored objects inside the passenger compartment of the automobile. For example, when the viewer wears light-colored clothing, light from the clothing (represented by arrow 34) is reflected by gauge cover 20. This occurrence is often referred to as the "white shirt syndrome". Because of the angle of gauge cover 20 and the position of brow 28, much of the reflection from the clothing (represented by 35) is projected toward brow 28 and not seen by the viewer.

Brows, such as brow 28, however, are cumbersome in design and require a substantial amount of material to construct and add weight to the automobile. It would be desirable to control the instrument panel gauge reflections without the use of a brow in order to provide more automobile design flexibility (both functionally and aesthetically) and to save on material cost and weight of the automobile.

Another problem with current instrument panel gauges, such as instrument panel gauge 10 shown in FIG. 1, is the reduction in clarity of the graphics because the graphics are on the subdial surface. When illuminated, the light source in the instrument panel gauge improves the clarity of the graphics, however a loss in graphics clarity is experienced when the panel is not illuminated, which is often the case during the day. For example, when the gauge cover is clear (or 100% transmitting), around 8% of normal daylight reflects back to the viewer (about 4% from first surface 21 of the gauge cover and about 4% from second surface 22 of the gauge cover). This leaves only about 92% of the normal daylight passing through to subdial surface 24.

If subdial surface 24 is reflective, then some of the light striking the subdial surface is reflected back to the viewer with another approximate 8% loss of light through the gauge cover again. When the subdial surface is about 80% reflective, only about 67% of the original light finally reaches the viewer's eyes. In summary, a greatly reduced level of original light (about 67%) finally reaches the viewer to provide an image of the graphics. The loss of light results in diminished clarity of the graphics to the viewer.

It is, therefore, one object of the present invention to provide an illuminating instrument panel gauge with a movable indicator which has a reduced level of reflections emitting from the gauge cover.

It is another object of the present invention to provide an illuminating instrument panel gauge with a movable indicator which presents more design flexibility than previous illuminating instrument panel gauges.

It is yet another object of the present invention to provide an illuminating instrument panel gauge with a movable indicator which does not require a brow.

It is still another object of the present invention to provide an illuminating instrument panel gauge with a movable indicator which has improved graphics clarity for the viewer relative to previous illuminating instrument panel gauges.

SUMMARY OF THE INVENTION

To achieve the foregoing objects, the present invention is an illuminating instrument panel gauge having a movable indicator, a front side for positioning toward a viewer and a back side for positioning away from the viewer. The instrument panel gauge includes a light source, a subdial surface in front of the light source, a transparent gauge cover in front of and spaced apart from the subdial surface, and graphics corresponding to the movable indicator. The gauge cover has a first surface at the front side of the gauge cover and a second surface at the back side of the gauge cover. Either or both of the first and second surfaces of the gauge cover may be randomly textured. The movable indicator is positioned between the subdial surface and the gauge cover, and is preferably closer to the gauge cover than it is to the subdial surface. The graphics are on either the first or second surface of the gauge cover.

Optionally, there may be an overlay between the light source and the indicator which allows light from the light source to illuminate the gauge cover yet hides the light source so that the light source is not visible to the viewer facing the instrument panel gauge. Additionally, the gauge cover may be curved and, correspondingly, the movable indicator may be shaped to follow the curvature of the gauge cover.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

Figure 2:
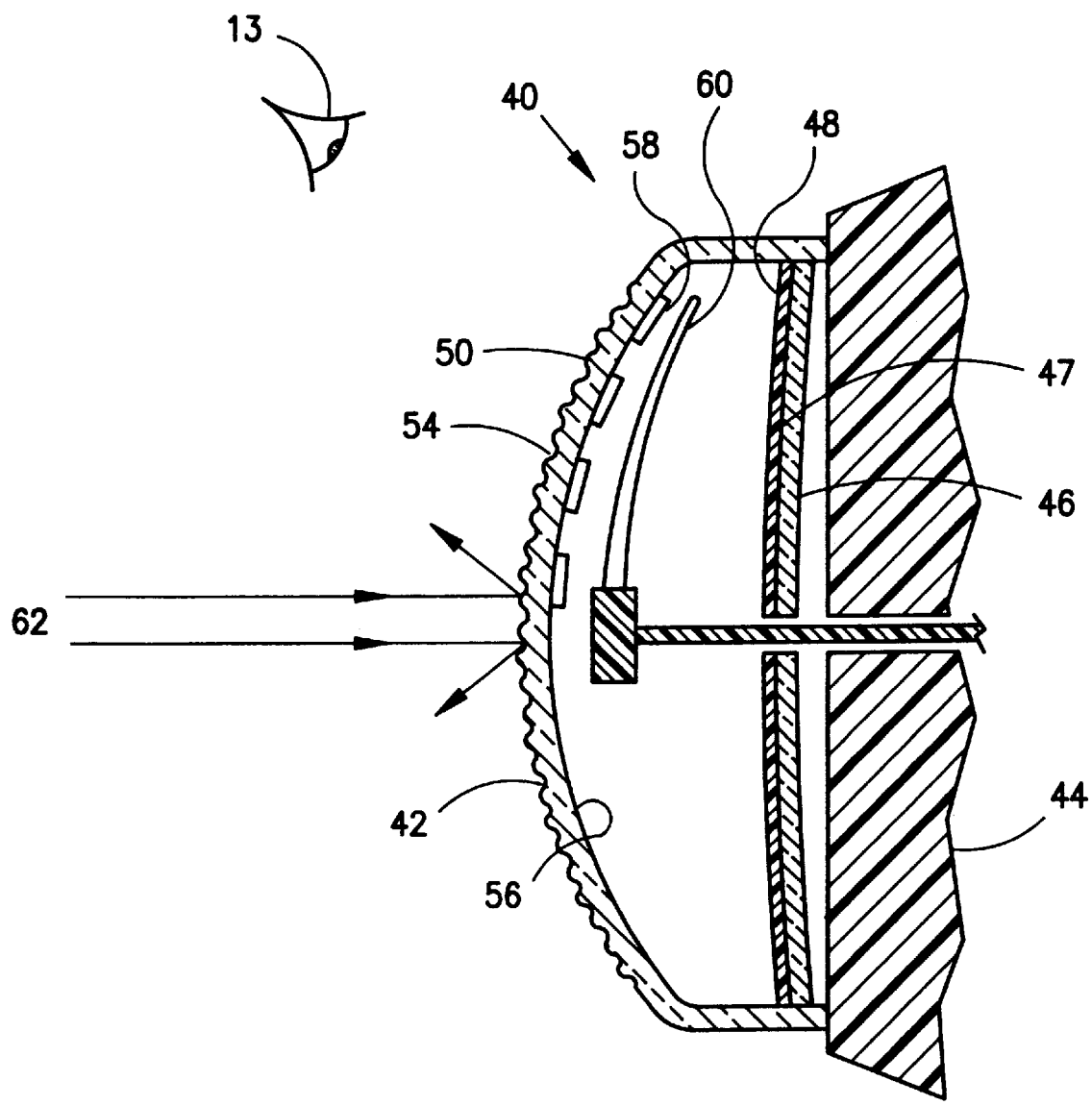
FIG. 2 is a cross sectional side view of an illuminating instrument panel gauge according to the present invention.
Figure 3:
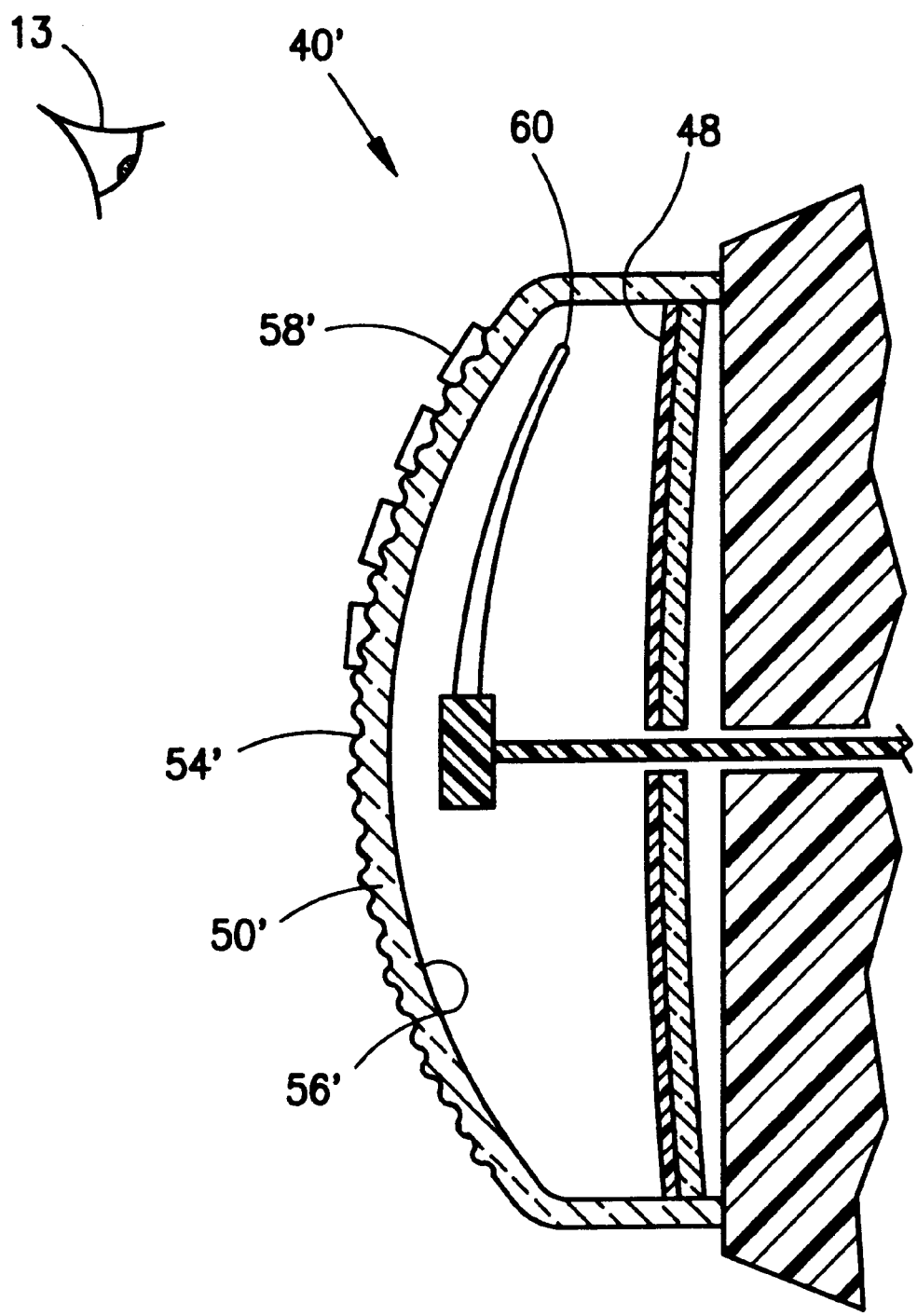
FIG. 3 is a cross sectional side view of another illuminating instrument panel gauge according to the present invention.

Referring to FIGS. 2 and 3, wherein like reference characters designate corresponding parts, illuminating instrument panel gauge 40 is shown having front side 42 for positioning toward the viewer (represented by eye 13), back side 44 for positioning away from the viewer, light source 46 at back side 44, overlay 47 in front of light source 46, subdial surface 48 being the front surface of overlay 47, gauge cover 50 in front of and spaced away from light source 46, and movable indicator 60 between subdial surface 48 and gauge cover 50.

Figure 1:
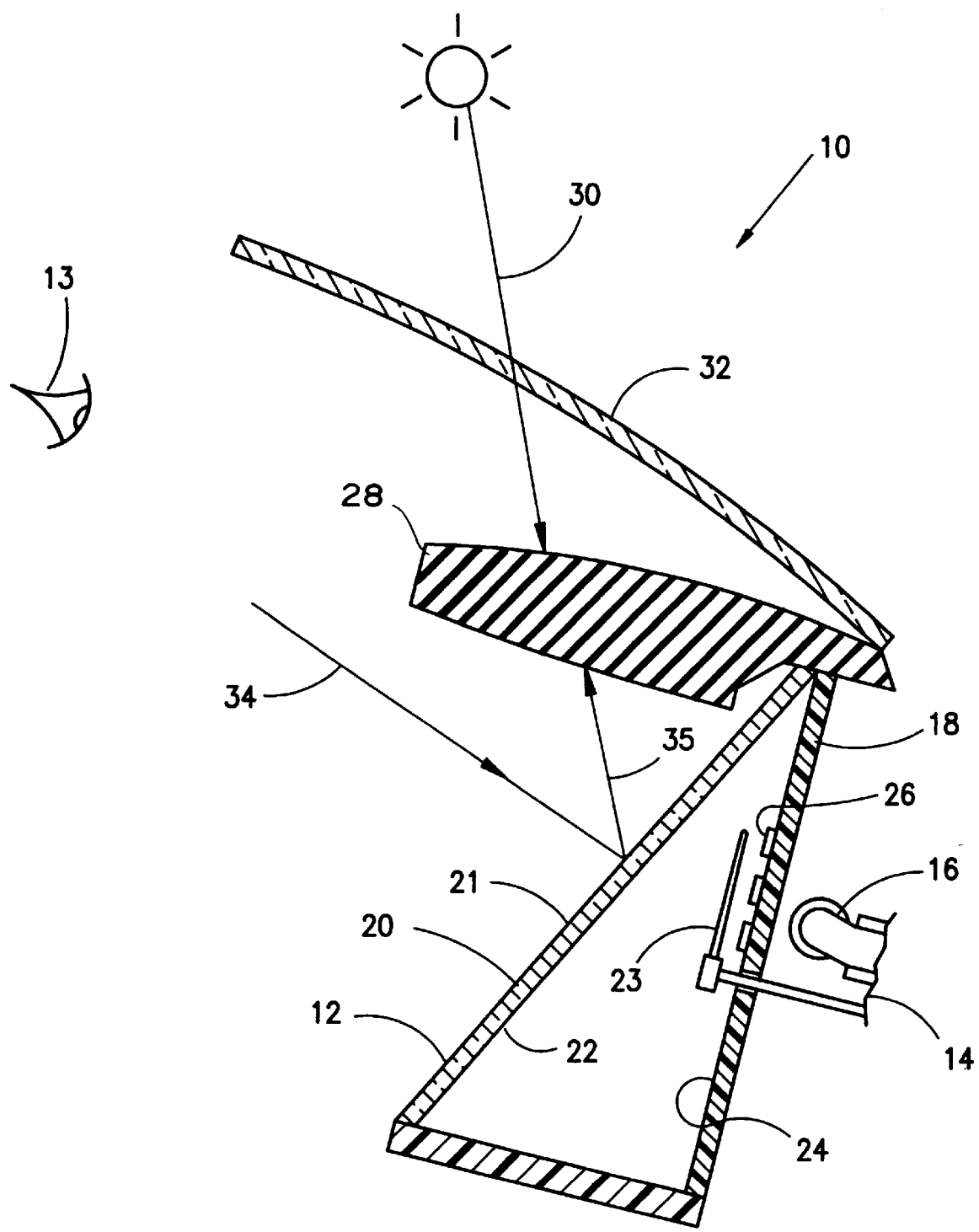
FIG. 1 is a cross sectional side view of an illuminating instrument panel gauge according to the prior art.

Gauge cover 50 has first surface 54 facing the front side of instrument panel gauge 40 and second surface 56 facing the back side of instrument panel gauge 40. Graphics 58 which correspond to movable indicator 60 are on second surface 56 of gauge cover 50. Having the graphics on second surface 56 rather than on subdial surface 48 (as in the prior art) improves the clarity of the graphics to the viewer since it alleviates the loss of transmittance of light due to any reflection from second surface 56 and any loss from the subdial surface itself. In instrument panel gauge 40, movable indicator 60 is shown closer to gauge cover 50 than to subdial surface 48. Having movable indicator 60 and the graphics in close proximity to one another improves the legibility of the gauge. In contrast, in prior art instrument panel gauges, the movable indicator is closer to the subdial surface than to the gauge cover (see FIG. 1).

Additionally, movable indicator 60 follows the contour of gaul cover 50, which also improves the legibility of the gauge. In FIG. 2, the gauge cover is shown curved, specifically, convex as seen from the direction of the viewer, and the movable indicator 60 follows the curvature of gauge cover 50. Preferably, movable indicator 60 is substantially parallel with gauge cover 50 as shown.

FIG. 3 shows a cross sectional side view of another embodiment of the present invention in which instrument panel gauge 40' has many of the same parts as instrument panel gauge 40 shown in FIG. 2. However, instrument panel gauge 40' has graphics 58' on first surface 54' of gauge cover 50'. Having the graphics on first surface 54' rather than on subdial surface 48 (as in the prior art) improves the clarity of the graphics to the viewer since it alleviates the loss of transmittance of light due to any reflection from first and second surfaces 54' and 56' and any loss due to the subdial surface itself. As with instrument panel gauge 40, movable indicator 60 in instrument panel gauge 40' is shown closer to gauge cover 50' than to subdial surface 48 to improve the legibility of the instrument panel gauge.

The instrument panel gauges of the present invention may have gauge covers which are textured on either or both of the first and second surfaces. Both gauge covers 50 and 50' are textured on their respective first surfaces. The graphics may be on the surface of the gauge cover that is opposite from the textured surface, or the texture and the graphics may be on the same side, i.e., both on the first surface of the gauge cover or both on the second surface of the gauge cover.

The texturing of the gauge cover helps to disperse any reflected light so that sun light or light clothing is not reflected directly back to the viewer but is dispersed in many directions. For example, in FIG. 2, arrows 62 shows light from a white shirt traveling to gauge cover 50 and reflecting in different directions due to the texturing rather than directly back to the viewer's eye.

The texturing of the gauge cover should be random to inhibit any new reflected pattern caused by the texture. Textures generally consist of peaks and valleys, and the distance between peaks should be less than the wavelength of visible light so that light is caused to scatter in many directions.

The gauge covers are typically formed of transparent, clear resin, such as acrylic resin. The surface texturing of the gauge covers may be accomplished by scotch brushing, grain-finishing methods, or by the method described in U.S. Pat. No. 4,114,983, which patent is incorporated herein by reference.

The light source of the instrument panel gauges of the present invention may be any conventional light source, such as an incandescent lamp, a fluorescent lamp, a vacuum fluorescent lamp, an electroluminescent lamp, light emitting diodes, and liquid crystal displays. Incandescent lamps are the preferred and most-commonly used light source.

The overlay of the instrument panel gauges hides the light source from the viewer yet allows light from the light source to illuminate the instrument panel gauge. The overlay may be translucent in that light may pass through it or it may be designed so that light passes around at least a portion of the periphery of the overlay or only through open or cut-away sections in the overlay. The overlay may optionally include cut-away sections to allow meters, such as an odometer, to be seen by the viewer.

The overlay may be a film or coating, such as paint or a metallic coating, placed on the light source or it may be sheeting placed in front of the light source, such as colored plastic sheeting. The overlay is commonly formed of "MYLAR", a polyethylene terephthalate available from E. I. du Pont de Nemours & Co., Inc., Wilmington, Del.

The movable indicator of an instrument panel gauge of the present invention is typically pivoting and controlled by the electronic system of the automobile. The movable indicator itself may also be illuminating.

The graphics on the gauge cover may be applied by any of many methods. For example, the graphics may be hot-stamped, printed via silk-screening techniques, embossed, or appliqued onto the gauge cover using adhesive.

Accordingly, the illuminating instrument panel gauges of the present invention have a reduced level of reflections from the gauge cover relative to previous instrument panel gauges. The illuminating instrument panel gauges of the present invention present more design flexibility than previous illuminating instrument panel gauges and may be designed to be browless. The instrument panel gauges of the present invention also have improved graphics clarity for the viewer relative to previous illuminating instrument panel gauges.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An illuminating instrument panel gauge having a movable indicator, a front side for positioning toward a viewer and a back side for positioning away from the viewer, the instrument panel gauge comprising:

a light source;

a subdial surface in front of the light source; and a transparent gauge cover in front of and spaced apart from the subdial surface, the gauge cover having a first surface at the front side of the gauge cover and a second surface at the back side of the gauge cover, the movable indicator being positioned between the subdial surface and the gauge cover;

graphics on a surface selected from the first and second surfaces of the gauge cover, the graphics corresponding to the indicator; and wherein one of the first and second surfaces of the gauge cover is randomly textured and the graphics are on the same surface as the random texture.

2. The instrument panel gauge of claim 1, further comprising an overlay between the light source and the indicator which allows light from the light source to illuminate the gauge cover yet hides the light source so that the light source is not visible to the viewer facing the instrument panel gauge.

3. The instrument panel gauge of claim 1, wherein the indicator is closer to the gauge cover than it is to the subdial surface.

4. The instrument panel gauge of claim 1, wherein the gauge cover is curved and the movable indicator is shaped to follow the curvature of the gauge cover.

5. An illuminating instrument panel gauge having a movable indicator, a front side for positioning toward a viewer and a back side for positioning away from the viewer, the instrument panel gauge comprising;

a light source;

a subdial surface in front of the light source; and a transparent gauge cover in front of and spaced apart from the subdial surface, the gauge cover having a first surface at the front side of the gauge cover and a second surface at the back side of the gauge cover, the movable indicator being positioned between the subdial surface and the gauge cover;

graphics on a surface selected from the first and second surfaces of the gauge cover, the graphics corresponding the indicator; and wherein one of the first and second surfaces of the gauge cover is randomly textured and the graphics are on the surface opposite the randomly-textured surface.

6. The instrument panel gauge of claim 5, further comprising an overlay between the light source and the indicator which allows light from the light source to illuminate the gauge cover yet hides the light source so that the light source is not visible to the viewer facing the instrument panel gauge.

7. The instrument panel gauge of claim 5, wherein the indicator is closer to the gauge cover than it is to the subdial surface.

8. The instrument panel gauge of claim 5, wherein the gauge cover is curved and the movable indicator is shaped to follow the curvature of the gauge cover.

9. An illuminating instrument panel gauge having a movable indicator, a front side for positioning toward a viewer and a back side for positioning away from the viewer, the instrument panel gauge comprising:

a light source;

a subdial surface in front of the light source; and a transparent, curved gauge cover in front of and spaced apart from the subdial surface, the gauge cover having a first surface at the front side of the gauge cover and a second surface at the back side of the gauge cover, wherein at least one of the first and second surfaces of the gauge cover is randomly textured and the movable indicator is positioned between the subdial surface and the gauge cover, is closer to the gauge cover than it is to the subdial surface, and is curved to follow the curvature of the gauge cover;

an overlay between the light source and the indicator which allows light from the light source to illuminate the gauge cover yet hides the light source so that the light source is not visible to the viewer facing the instrument panel gauge; and graphics on a surface selected from the first and second surfaces of the gauge cover, the graphics corresponding to the indicator.

* * * * *